May 28, 1935. C. M. JAMESON 2,002,857
ANTIBACK ROLL MECHANISM FOR CARS
Filed Feb. 1, 1932 2 Sheets-Sheet 1
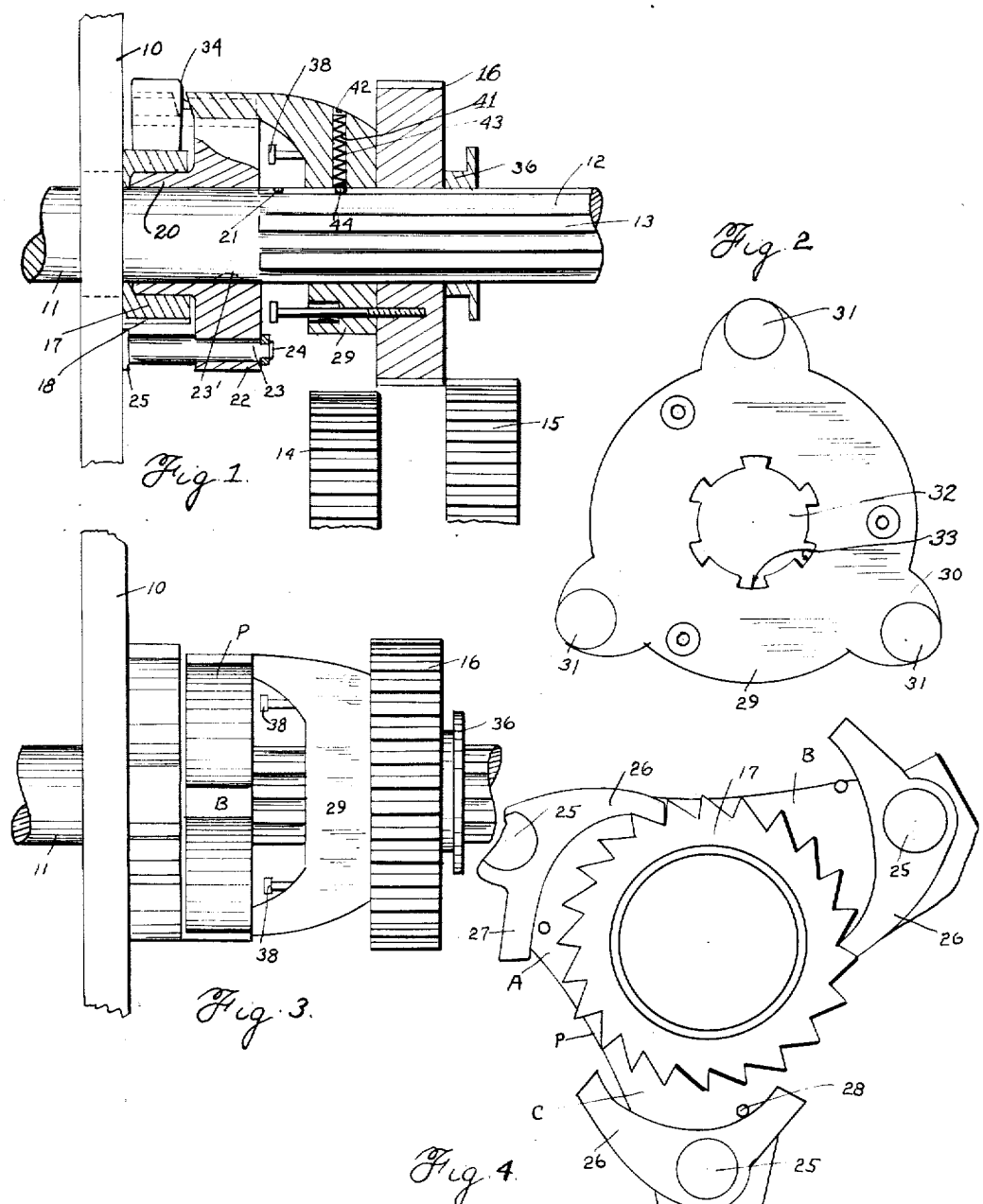
INVENTOR.
Chas. M. Jameson

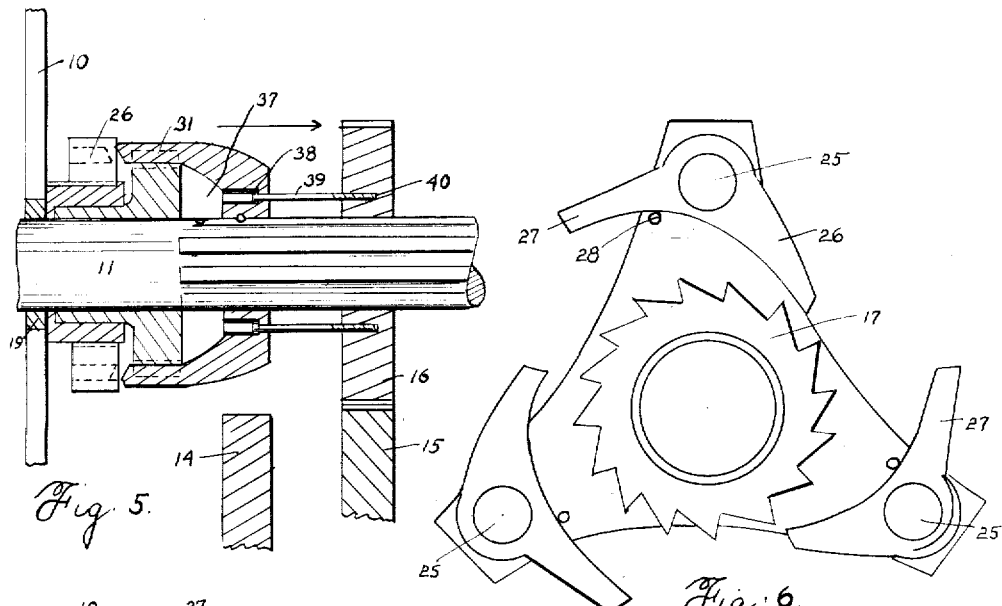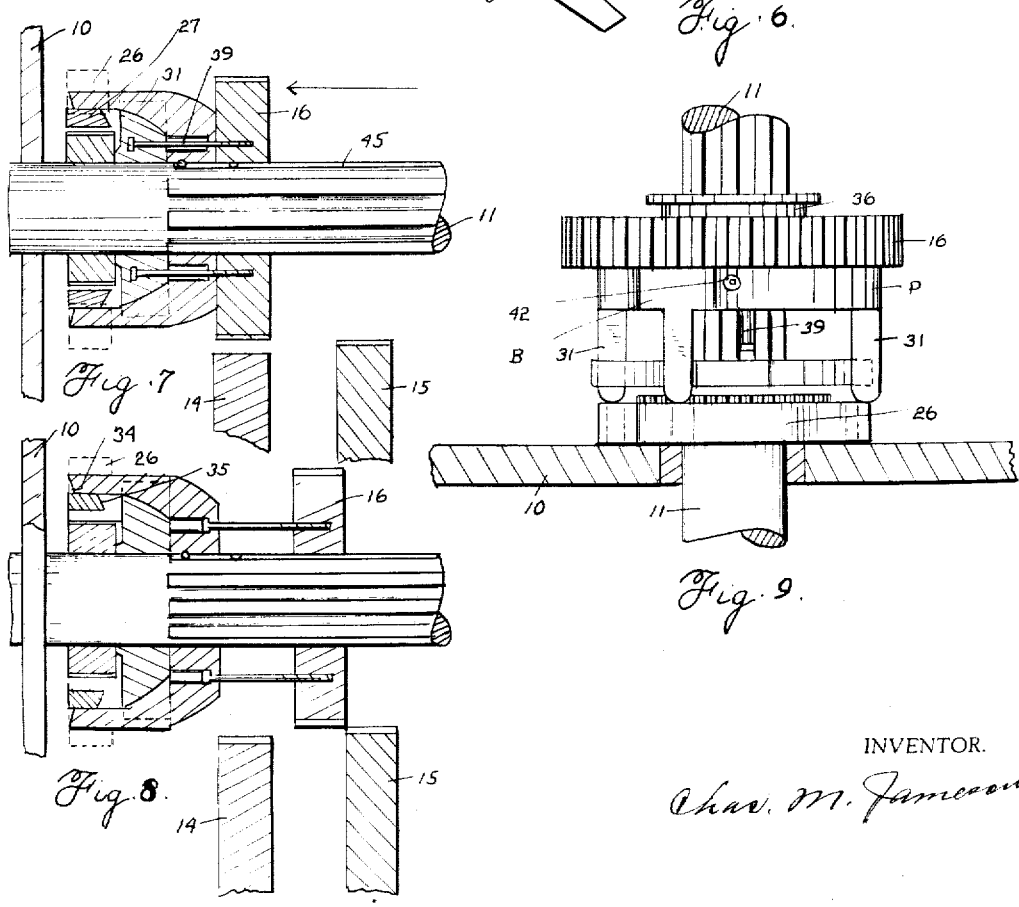

Patented May 28, 1935

2,002,857

UNITED STATES PATENT OFFICE 2,002,857

ANTIBACK ROLL MECHANISM FOR CARS

Charles M. Jameson, Pasadena, Calif.

Application February 1, 1932, Serial No. 590,169

5 Claims. (Cl. 192—4)

This invention relates to improvements in control mechanism for motor vehicles and more particularly to a control for the transmission shaft thereof.

One of the objects of this invention is to provide a simple, efficient and inexpensive device for use in connection with the transmission shaft of an internal combustion engine whereby back-roll or any tendency of the car to roll down a hill, at the exact moment when the transmission gears are being shifted, or before the brakes are applied, is obviated effectively.

It is well known that a motor vehicle, on reaching the top of a hill or going up on a grade will roll back when the car is not geared for forward motion, just before the brakes are applied, or when the brakes have been released and just prior to placing the gears in low position to start the car in a forward movement. Such back-roll tendency on the part of the car is very often fatal. The present invention automatically prevents this back-roll in any occasion where same could arise.

A further object of this invention is to provide simple means designed to be juxtaposed in connection with the moving parts of a car, and in the vicinity of the transmission shaft thereof, whereby, when the gears are in mesh for forward speeds or neutral directly therefrom, retrograde movement thereof is prevented automatically, or during slow movements of the car on an up-grade retrograde movement is eliminated.

A further object of this invention is provide means designed to be on duty at all times, to prevent the hazard of reverse movement of the car, and at the same time when it is desired to reverse the car this will be accomplished automatically so as not, at this time, to effect the reversal of the car.

A still further object thereof is to provide an arrangement of parts whereby, when the transmission gears are shifted, if need be, to place the gear shift lever in neutral position, the car will not roll back or be capable of a reverse movement, so that should the car be on an up-grade when the gear shift is placed in neutral position, before the brakes are applied, the car will stand still.

A final object of this invention is to make the back-rolling stop action on a car entirely automatic so as not to require attention on the part of the driver, the means provided for preventing back-roll functioning in time with the shifting of the gears from driving into neutral position or when it is designed to bring the car to a stop without using brakes. When it is desired to reverse the car, and this occurs on a down grade and the reversing gear action is too slow, the gears can be placed in neutral as is now done, and the anti-back roll mechanism will be inoperative to prevent the car rolling down the hill, but this back roll thus allowed is designed and is manually controlled at all times.

With the above and other objects in view my invention consists in the arrangement, combination and details of construction disclosed in the drawings and specification, and then more particularly pointed out in the appended claims.

In the drawings, wherein similar reference characters designate similar parts thruout the respective views, Figure 1 is a longitudinal sectional elevation of the parts of my invention, showing the transmission gear in neutral position, with the anti-back roll device in operation, Figure 2 is a side elevation of the shifter device for disengaging the dogs from the ratchet to be described, Figure 3 is a side elevation of the parts of my invention mounted upon a transmission shaft, Figure 4 is a side elevation of the carrier upon which the dogs are mounted.

Figure 5 is a longitudinal sectional elevation of the device showing the transmission shaft in low position, and the anti-back roll device in operation, Figure 6 shows a side elevation of the carrier, Figure 7 is a view similar to Figure 5 but showing the gear in reverse position, Figure 8 is a side elevation of the carrier showing the dogs out of engagement with the ratchet and Figure 9 is a top plan view of my invention, In the drawings, which are merely illustrative of my invention 10 designates any suitable frame, such as part of the gear case, thru which the transmission shaft 11 passes rotatedly, which shaft will be preferably formed with a series of longitudinal ribs 12, for a portion of its length, the flutes 13 extending longitudinally between these ribs. 14 designates the reverse gear of the standard gear arrangement now used in automobiles, and 15 is the low gear of the same train of standard gears now found on automobiles.

A fixed ratchet gear 17 has the peripheral teeth 18 and a concentric part 19 fixedly and non-rotatedly projecting thru the frame wall 10. Revolvably fitting into the stationary ratchet gear is the bushing or sleeve 20 of a carrier 22, which is splined at 23' to the shaft 11 where the latter is not formed with the flutes 13 so as to rotate with the shaft. This carrier is shaped as shown in Figure 4 where it is shown to be composed of three radially opposed arms, each arm A, B, and C of which carries one of the dogs 26, of a curvilinear shape, each dog having the stem 26 curving forwardly thereof and having the click M designed to engage with any of the teeth 18 of the ratchet gear 17. The dogs are eccentrically mounted upon pins 23, properly positioned at their inner ends in the arms A, B, and C of the carrier 22, having reduced extreme inner ends headed out as shown at 24 to hold these pins against accidental displacement. The dogs are mounted movably upon the outer ends of these pins 23 which project beyond the face of the carrier 22. The outer flanges 25 of the pins also serve to hold the dogs against displacement from the carrier. The carrier carries stop pins 28 which are located adjacent to the stems 27 of the dogs 26, and are provided as a means of limiting the disengaged positions of the dogs when they are released from the teeth of the ratchet gear.

I also provide a shifter 29 which may be shaped as shown in Figure 2, so that it is provided at equal distances apart with radially projecting ears 30, upon which are formed the forwardly curving pusher arms 31, three in number. The shifter has a central opening 32, into the edge of which a series of circumferentially spaced apart recesses 33 are formed, so when this shifter is slid upon shaft 11 the recessed parts will ride upon the ribs 12 of the shaft, as a means of enabling this shifter to slide upon the shaft as it slides. It will be seen that the pusher arms 31 may project, and they are so located upon the shifter that they may readily project slidably into the recessed edges P of the carrier 22, laterally of the arms A, B, and C thereof. The tip ends of the pusher arms are beveled as at 34, to cooperate with the correspondingly beveled edges 35 formed upon the sides of the dogs 26, as shown in Figures 5, 6, and 7 respectively.

I also provide the usual slidable shifting low and reverse gear 16 which has the same central opening 32 and recessed parts 33 as is shown on the shifter in Figure 2, whereby this gear is enabled to slide upon shaft 11 at the same time that it is free to rotate therewith. This gear is provided with the usual shifting collar 36 designed to be slid upon the shaft when engaged by the usual shipper element such as is found upon automobiles. In order to lock the shifter in any of its adjusted positions use is made of a ball 44 designed to slide in a groove 45 formed upon the shaft 11, two nicks 21 being provided in this groove to provide stop positions for the shifter. There is a socket 43 formed in the shifter, in which a coiled spring 41 is lodged which at its lower end bears upon the ball 44, a cap 42 being screwed home into the upper end of this socket to confine the spring adjustably therein. Sockets, 37, three in number are also formed in the shifter 29, for the slidable reception of the heads 38 of elongated pins 39, which at their inner ends are screw threaded into the gear 16.

In operation the various parts thus described function in the following manner. In Figure 1 the parts are in the proper positions to allow the dogs 26 to engage the teeth of the ratchet wheel or gear 17, since the shifter 29 has been retracted so its pusher arms 31 will not engage the beveled edges 35 of the dogs to disengage them from this ratchet gear. The shifter is now locked by means of the ball 44 in the nick 21. The shifter is now in normal position, and the gear 16 is in neutral position, or when the car is running at second or high speed. When the car is moving forwardly at an increased momentum the dogs 26 may swing out of engagement with the teeth of the ratchet gear as indicated in Figure 8. When the car is negotiating an up grade and the driver has kicked in his clutch, altho the gears are engaged in any desired position, low or high, the dogs will be engaged with the ratchet gear and hold the car from rolling back.

While the dogs are thus in operative position, the gear 16 may be shifted upon the shaft 11 into low position as shown in Figure 5 where it meshes with the low gear 15. In making this movement it carries along with it the elongated rods 39, the rods sliding adjustably thru the shifter 29, and the heads 38 of the pins or rods coming to rest in the sockets 37 at the inner walls of the latter, when the gear has been placed in low position. In this manner there is play between the gear and shifter, so the shifter is not disturbed in its inoperative position. Hence with the car in low, or high the dogs remain in engagement depending on the speed, but during slow speed they are always in engagement.

Figure 7 shows the gear 16 moved or shifted into reverse position to allow the car to reverse; this cannot, of course, take place until the dogs have been disengaged from the ratchet gear. The shifter must now be advanced, and the gear 16 accomplishes this by forcibly contacting the shifter and pushing it forwardly, and now the pusher arms 31 of the shifter engage with their beveled edges 34 upon the beveled edges 35 formed upon the dogs 35, and this will raise the dogs out of engagement with the teeth of the ratchet; the shifter is now locked by the ball 44 in the other nick 21 in the groove 45 of the shaft 11. The car may now reverse as the shaft is no longer held against retrograde movement.

In Figure 7 it is designed to show that should the car be reversing down a hill, and it is desired to accelerate its back movement by allowing it to roll down, the operator shifts the gear 16 out of reverse position, shown in Figure 6, into neutral position, and as this occurs the gear moves away from the shifter without disturbing the position of the latter, which is still in locked position. When the gear 16 moved to the left shown in Figure 6, the rods or pins 39 slid backwardly thru the sockets 37, and when it moved to the left to neutral position shown in Figure 8, the rods again idle and slide in these sockets so play exists between gear and shifter. When the gear is placed in low again the parts are restored to the positions disclosed in Figure 1. I do not intend to confine myself to the exact details of construction disclosed herein but cover all variations falling within the purview of the appended claims.

What I desire to claim and secure by Letters Patent is:—

1. A device of the kind described consisting of a transmission shaft, a ratchet mounted thereon against rotation, a plurality of dogs held by gravity in engagement with the ratchet, a carrier rotating with the shaft and upon which the dogs are mounted, a low and reverse sliding gear mounted on said shaft, means allowing the gear to rotate with the shaft as it slides thereupon, and means intercoupling together the slidable gear and carrier, whereby the gear may slide while the carrier remains stationary, and means controlled by the intercoupling means and designed to engage the dogs to hold them out of engagement with the ratchet.

2. A device as described consisting of a transmission shaft, a fixed ratchet held against rotation thereupon, a carrier rotating upon the shaft, a series of dogs pivotally mounted upon the carrier, and engaged by gravity with the ratchet, to prevent retrograde movement of the shaft in one direction, means slidable upon and rotating with the shaft designed to be moved into engagement with the dogs to lift any of them out of engagement with the ratchet, a transmission low and reverse gear being slidable upon the shaft, and coupling means whereby the gear and the last-named means may be connected together for joint rotation and whereby the gear may slide relatively to the said means.

3. A device as described consisting of a transmission shaft, a low and reverse gear slidably adjustable thereupon, a fixed ratchet wheel encircling the shaft at one end, and against rotation, a carrier rotating with the shaft, a series of dogs pivotally mounted upon the carrier so as to rotate therewith and engaged by gravity with the teeth of the ratchet to hold the shaft against retrograde movement, means slidable upon the shaft and movable into engagement, in one direction, with the dogs to lift them out of engagement with the ratchet to free the shaft from the ratchet, and means connecting the gear with the slidable means whereby when the means disengages the dogs the gear may rotate therewith and slide relatively thereto, and whereby when the means is out of engagement with the dogs the gear may be slid to engage it with the dogs.

4. A device as described consisting of a transmission shaft, a fixed ratchet encircling the shaft, slidable means on the shaft and rotating therewith, a body fixedly mounted upon the shaft adjacent to said ratchet, dogs movably mounted upon the body to rotate therewith and held by gravity into engagement with the ratchet to hold the shaft against reverse movement, a low and reverse gear slidably mounted upon and rotating with the shaft and designed to forcibly engage the slidable means to cause it to engage the body, means on the slidable means designed to engage with the dogs to lift them out of engagement with the ratchet, when slid along by the gear, and means carried by the gear slidably coupled to and thru said slidable means whereby the gear may move away from the slidable means without moving the slidable means.

5. In combination with a transmission shaft, means engageable with the shaft for holding it against retrograde movement, a low and reverse gear on said shaft, means sliding on and being rotatable with the shaft and having provision for rendering the first means inoperative to allow free movement of the shaft, said gear designed to move the second means into operative position, by physical contact therewith, and means loosely connecting the first gear and the second means to allow it to rotate therewith and to allow it to move laterally thereof without moving said means to engage with the reverse gear, said gear having provision for moving the second means into inoperative position.

CHAS. M. JAMESON.